(12) United States Patent
Lee et al.

(10) Patent No.: US 9,507,092 B2
(45) Date of Patent: Nov. 29, 2016

(54) OPTICAL FIBER FLEXIBLE MULTI-WAVELENGTH FILTER AND METHOD OF CONTROLLING WAVELENGTH OF SPECTRUM USING THE SAME

(71) Applicant: Pukyong National University Industry-University Cooperation Foundation, Busan (KR)

(72) Inventors: Yong Wook Lee, Busan (KR); Kyoung Soo Park, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 14/330,876

(22) Filed: Jul. 14, 2014

(65) Prior Publication Data

US 2016/0004013 A1 Jan. 7, 2016

(30) Foreign Application Priority Data

Jul. 4, 2014 (KR) ........................ 10-2014-0083660

(51) Int. Cl.
*G02B 6/293* (2006.01)
*G02F 1/01* (2006.01)
*G02F 1/225* (2006.01)
*G02F 1/21* (2006.01)

(52) U.S. Cl.
CPC ......... *G02B 6/29302* (2013.01); *G02F 1/0136* (2013.01); *G02F 1/2252* (2013.01); *G02F 2001/211* (2013.01); *G02F 2202/40* (2013.01); *G02F 2203/055* (2013.01)

(58) Field of Classification Search
CPC G02B 6/29302; G02F 1/0136; G02F 1/2252
See application file for complete search history.

(56) References Cited

U.S. PATENT DOCUMENTS

| 7,027,135 B2 * | 4/2006 | Fu | G02B 6/272 356/73.1 |
| 2012/0328230 A1 * | 12/2012 | Lee | G02B 6/27 385/11 |
| 2013/0230271 A1 * | 9/2013 | Lee | G02B 6/00 385/12 |

FOREIGN PATENT DOCUMENTS

| JP | 2006-163344 A | | 6/2006 |
| JP | 2006163344 A | * | 6/2006 |
| KR | 10-2013-0007691 A | | 1/2013 |

\* cited by examiner

*Primary Examiner* — Omar R Rojas
(74) *Attorney, Agent, or Firm* — The PL Law Group, PLLC

(57) ABSTRACT

An optical fiber flexible multi-wavelength filter based on a polarization-diversity loop includes a pair of high-birefringence optical fibers, a polarization beam splitter connected to the pair of high-birefringence optical fibers and dividing light incident from a broadband light source into two polarized beams, and a polarization controller connected to the high-birefringence optical fibers or the polarization beam splitter and controlling the two polarized beams divided by the polarization beam splitter. The polarization controller includes a ½ wave plate or a ¼ wave plate, and the polarization controller disposed between the high-birefringence optical fibers controls an angle difference between principal axes of the high-birefringence optical fibers and visibility. Interference in the high-birefringence optical fibers is controlled via changing polarized light incident from the broadband light source using the polarization controller.

9 Claims, 3 Drawing Sheets

OPTICAL FIBER FLEXIBLE MULTI-WAVELENGTH FILTER AND METHOD OF CONTROLLING WAVELENGTH OF SPECTRUM USING THE SAME

CROSS-REFERENCE TO RELATED APPLICATION

This application claims priority to and the benefit of Korean Patent Application No. 10-2014-0083660, filed on Jul. 4, 2014, the disclosure of which is incorporated herein by reference in its entirety.

BACKGROUND

1. Field of the Invention

The present invention relates to an optical fiber flexible multi-wavelength filter and a method of controlling a wavelength of a spectrum using the same. More specifically, the present invention relates to an optical fiber flexible multi-wavelength filter showing a variety of transmission characteristics of a spectrum and a method of controlling a wavelength of a spectrum using the same.

2. Description of the Related Art

In an optical communication system, multi-wavelength light sources or all-fiber wavelength-selective filters have received much attention as the main devices used for satisfying the demand for increasing bandwidth.

Among such devices, optical fiber filters are used as a core element for wavelength routing in a wavelength-division-multiplexing network. In the optical fiber filters, it is important to maintain the wavelength space of the filter, and precisely adjust the position of the absolute wavelength to be within an ITU-grid standard wavelength of a wavelength division multiplexed network.

Meanwhile, many studies have been made on optical fiber multi-wavelength filters because of the ease of design and use thereof, and a mechanical method and a polarization control method, etc. have been proposed in order to control the absolute wavelength of a channel of the optical fiber multi-wavelength filter.

Optical fiber multi-wavelength filters may be fabricated using a high-birefringence optical fiber in an optical path of a Sagnac interferometer, which is an interferometer configured in such a manner that two waves which propagate along the same optical path, but in opposite directions, interfere with each other. Sagnac interferometers have several advantages, such as a simple structure, ease of use, and a variety of wavelength selection characteristics.

When an optical fiber multi-wavelength filter based on a polarization-diversity loop is fabricated in the optical fiber multi-wavelength filter using a polarization beam splitter instead of an optical fiber coupler, properties associated with wavelength switching including wavelength interleaving may be obtained.

In particular, in the optical fiber multi-wavelength filter based on the polarization-diversity loop, a high order transfer function capable of obtaining various transmission spectra can be generated using several strands of high-birefringence optical fibers.

For example, a Solc type filter implements the high order transfer function via connecting high-birefringence optical fibers to generate an angle difference (i.e., azimuth) between principal axes of high-birefringence optical fibers neighboring each other and having the same length. In addition, a Lyot type filter implements the high order transfer function by connecting high-birefringence optical fibers neighboring each other to have the same length and connecting a polarizer between high-birefringence optical fibers.

Existing Solc type optical fiber multi-wavelength filters based on a polarization-diversity loop are fabricated by fixedly connecting two high-birefringence optical fibers having the same length in such a manner that an angle difference between the principal axes becomes 45° using a fusion splicing method. In the Solc type optical fiber multi-wavelength filters based on a polarization-diversity loop, an interference spectrum in a flat transmission band mode and an interleaved result of the interference spectrum can be obtained among a first interference spectra.

However, the above-described existing method cannot implement a transfer function showing interference spectra other than the first interference spectra, and only the results of interleaving in a flat transmission band mode among the first interference spectra have been reported.

SUMMARY

The present invention is directed to an optical fiber flexible multi-wavelength filter showing a variety of transmission characteristics of a spectrum and a method of controlling a wavelength of a spectrum using the same.

According to an aspect of the present invention, provided is an optical fiber flexible multi-wavelength filter based on a polarization-diversity loop including a pair of high-birefringence optical fibers, a polarization beam splitter connected to the pair of high-birefringence optical fibers and dividing light incident from a broadband light source into two polarized beams, and a polarization controller connected to the high-birefringence optical fibers or the polarization beam splitter and controlling the two polarized beams divided by the polarization beam splitter. The polarization controller includes a ½ wave plate or a ¼ wave plate, and the polarization controller disposed between the high-birefringence optical fibers controls an angle difference between principal axes of the high-birefringence optical fibers and visibility. Interference in the high-birefringence optical fibers is controlled via changing polarized light incident from the broadband light source using the polarization controller.

In some embodiments, the high-birefringence optical fibers, the polarization beam splitter, and the polarization controller may be interconnected through an optical fiber, and the optical fiber may be connected using any one of a fusion splicing method, an optical fiber patch cord, and a mechanical splicer.

In other embodiments, the optical fiber may include one or more of a single-mode optical fiber, a multi-mode step-index optical fiber, a multi-mode graded-index optical fiber, and a high numerical aperture multi-mode optical fiber.

In still other embodiments, the optical fiber may include one or more of a silica-based optical fiber, a fluorine-based optical fiber, a rare-earth-based optical fiber, a polymer-based optical fiber, and a flint glass optical fiber.

In still other embodiments, the optical fiber may include one or more of a photonic crystal optical fiber, a multi-core optical fiber, a twisted optical fiber, an etched optical fiber, a tapered optical fiber, a lensed optical fiber, and a metal-coated optical fiber.

In still other embodiments, the optical fiber may include one or more of a polarization-maintaining optical fiber, a nonlinear optical fiber, a dispersion-shifted optical fiber, a dispersion compensation optical fiber, and a non-zero dispersion-shifted optical fiber.

In still other embodiments, the high-birefringence optical fibers may include one or more of a bowtie-type high-birefringence optical fiber, a panda-type high-birefringence optical fiber, an elliptical core-type high-birefringence optical fiber, a polarization-maintaining photonic-crystal optical fiber, and a polarization-maintaining large-mode area optical fiber.

In still other embodiments, the polarization controller may be a bulk-type or an optical fiber-type.

According to another aspect of the present invention, provided is a method of controlling a wavelength of a spectrum using the optical fiber flexible multi-wavelength filter including providing the polarization controller having the ½ wave plate or the ¼ wave plate, wherein the polarization controller disposed between the high-birefringence optical fibers controls an angle difference between the principal axes of the high-birefringence optical fibers and visibility, and controlling interference in the high-birefringence optical fibers by changing polarized light incident from the broadband light source using the polarization controller to generate a multi-wavelength interference spectrum and interleaving of a wavelength of the spectrum.

BRIEF DESCRIPTION OF THE DRAWINGS

The above and other embodiments the present invention will become more apparent to those of ordinary skill in the art by describing in detail exemplary embodiments thereof with reference to the accompanying drawings, in which.

DETAILED DESCRIPTION

Figure 1:
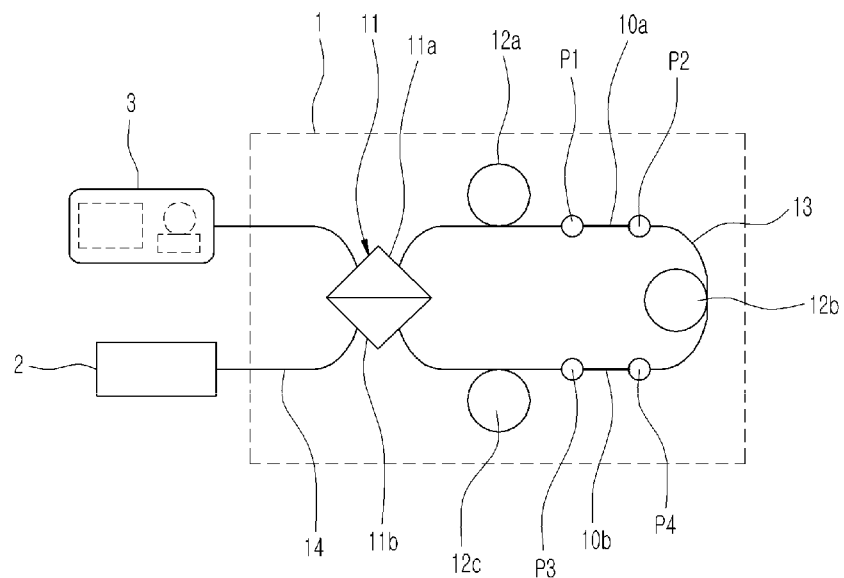
FIG. 1 is a conceptual diagram of an optical fiber flexible multi-wavelength filter.

Exemplary embodiments of the present invention will be described in detail below with reference to the accompanying drawings. However, exemplary embodiments of the present invention may be embodied in many alternate forms and should not be construed as limited to the exemplary embodiments of the present invention set forth herein. In the drawings, the thicknesses of layers and regions may be exaggerated or omitted for clarity. Like numerals refer to like elements throughout the description of the figures.

It will be understood that when an element or layer is referred to as being "connected to" or "coupled to" another element or layer, it can be directly connected or coupled to the other element or layer or intervening elements or layers may be present. It will be further understood that the terms "comprises," "comprising," "includes," and/or "including," when used herein, specify the presence of stated elements and/or components, but do not preclude the presence or addition of one or more other elements and/or components.

FIG. 1 is a conceptual diagram of an optical fiber flexible multi-wavelength filter.

As illustrated in FIG. 1, an optical fiber flexible multi-wavelength filter 1, according to an exemplary embodiment of the present invention, is based on a polarization-diversity loop structure. The optical fiber flexible multi-wavelength filter 1 includes a pair of high-birefringence optical fibers 10a and 10b, a polarization beam splitter 11, and a polarization controller 12a, 12b, and 12c.

The pair of neighboring high-birefringence optical fibers 10a and 10b are used as a birefringence element for generating an interference spectrum, and may be connected to an optical fiber 13 in the form of a closed circuit at four fusion-splicing points. Through the optical fiber 13, various optical elements, for example, the polarization beam splitter 11 and the polarization controller 12, may be connected to form a polarization-diversity loop structure.

The high-birefringence optical fibers 10a and 10b may be optical fibers having high birefringence and include at least one of a bowtie-type high-birefringence optical fiber, a panda-type high-birefringence optical fiber, an elliptical core-type high-birefringence optical fiber, a polarization-maintaining photonic-crystal optical fiber, and a polarization-maintaining large-mode area optical fiber.

The polarization beam splitter 11 is connected to the pair of high-birefringence optical fibers 10a and 10b, and has polarizers 11a and 11b in order to divide light incident from the broadband light source 2 into two polarized beams. The polarizers 11a and 11b are used to divide the incident light into a vertically polarized light component and a horizontally polarized light component, which are perpendicular to each other.

Although not shown in detail, a first to fourth terminals are formed in the polarizers 11a and 11b of the polarization beam splitter 11. The first terminal is connected to the broadband light source 2 to be used as an input of the optical fiber flexible multi-wavelength filter 1. The second terminal of the polarization beam splitter 11 may output the vertically polarized light component of the light incident on the first terminal. The third terminal of the polarization beam splitter 11 may output a horizontally polarized light component of the light incident on the first terminal. The fourth terminal of the polarization beam splitter 11 may be used as an output of the optical fiber flexible multi-wavelength filter 1, and connected to an optical spectrum analyzer 3.

The polarization controller 12 may be connected to the high-birefringence optical fibers 10a and 10b or the polarization beam splitter 11 through the optical fiber 13, and include three ½ wave plates 12a to 12c or ¼ wave plates in order to control the two polarized beams divided by the polarization beam splitter 11.

In addition, the polarization controller 12 may be a bulk-type or an optical fiber-type, and configured as ½ wave plates 12a to 12c, ¼ wave plates, or a combination of the ½ wave plates 12a to 12c and the ¼ wave plates.

The polarization controller 12 may be formed between the high-birefringence optical fibers 10a and 10b, and control an angle difference (i.e., azimuth) between principal axes of the high-birefringence optical fibers 10a and 10b and visibility. The polarized light incident from the broadband light source 2 may be changed by the polarization controller 12, and thus the interference in the high-birefringence optical fibers 10a and 10b may be controlled.

The optical fiber flexible multi-wavelength filter 1, according one exemplary embodiment of the present invention, may be connected to the broadband light source 2 and the optical spectrum analyzer 3 through the polarization beam splitter 11, and the polarization beam splitter 11, the broadband light source 2, and the optical spectrum analyzer 3 may be interconnected through an optical fiber 14.

The optical fiber 13 configured to interconnect the high-birefringence optical fibers 10a and 10b, the polarization beam splitter 11, and the polarization controller 12; and the optical fiber 14 configured to interconnect the polarization beam splitter 11, the broadband light source 2, and the optical spectrum analyzer 3 may be connected using one of a fusion splicing method, an optical fiber patch cord, and a mechanical splicer.

Such optical fibers 13 and 14 may be configured in any one or a combination of various types according to the structures of the optical fibers 13 and 14, materials of the optical fibers 13 and 14, methods of fabricating the optical fibers 13 and 14, and optical properties of such optical fibers 13 and 14.

Hereinafter, the optical fibers 13 and 14 according to the above-described characteristics will be further described, but the optical fibers 13 and 14 are not limited to the following descriptions.

First, the optical fibers 13 and 14 may include one or more of a single-mode optical fiber, a multi-mode step-index optical fiber, a multi-mode graded-index optical fiber, and a high numerical aperture multi-mode optical fiber according to their structure.

The single-mode optical fibers are applied to the optical fibers 13 and 14 according to the exemplary embodiment of the present invention. The single-mode optical fibers 13 and 14 have cut-off frequencies by which optical elements are connected to guide light in a single-mode.

The optical fibers 13 and 14 may include one or more of a silica-based optical fiber, a fluorine-based optical fiber, a rare-earth-based optical fiber, a polymer-based optical fiber, and a flint glass optical fiber, according to the material used.

The optical fibers 13 and 14 may include one or more of a photonic crystal optical fiber, a multi-core optical fiber, a twisted optical fiber, an etched optical fiber, a tapered optical fiber, a lensed optical fiber, and a metal-coated optical fiber, according to the manufacturing method used.

Finally, the optical fibers 13 and 14 may include one or more of a polarization-maintaining optical fiber, a nonlinear optical fiber, a dispersion-shifted optical fiber, a dispersion compensation optical fiber, and a non-zero dispersion-shifted optical fiber, according to their optical properties.

Figure 2:
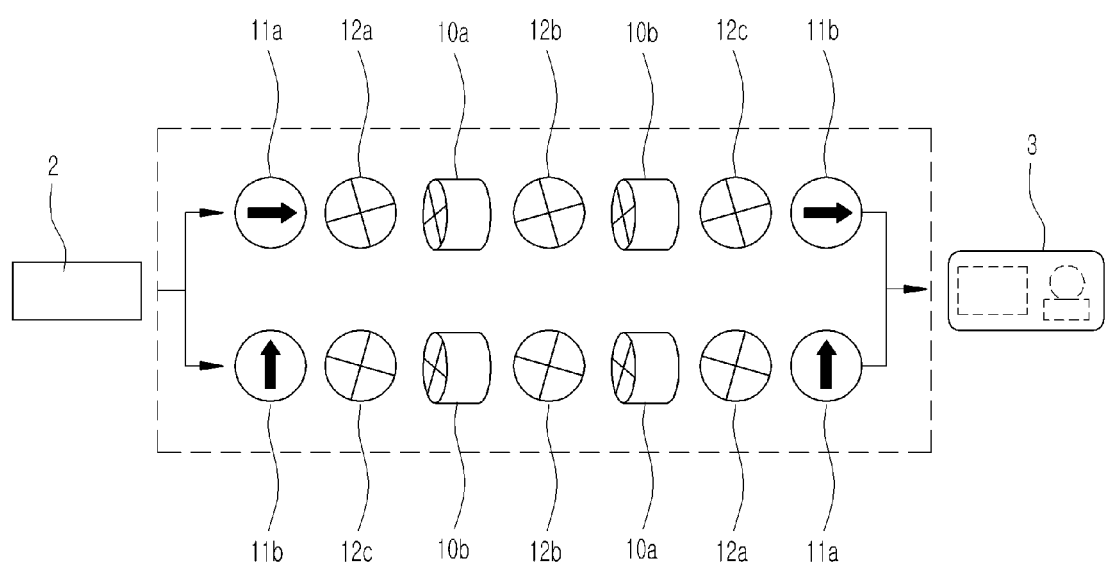
FIG. 2 is a conceptual diagram showing a propagation path of light in an optical fiber flexible multi-wavelength filter.

FIG. 2 is a conceptual diagram showing a propagation path of light in an optical fiber flexible multi-wavelength filter.

The wavelength of a spectrum may be controlled through the optical fiber flexible multi-wavelength filter 1 having the configuration described in FIG. 1.

For this, the polarization controller 12 has three ½ or ¼ wave plates (12a to 12c), and the wave plate (12b) is disposed between the high-birefringence optical fibers 10a and 10b to control the angle difference between the principal axes of the high-birefringence optical fibers 10a and 10b and visibility.

That is, the polarized light incident from the broadband light source 2 may be changed via the polarization controller 12, and thus interference in the high-birefringence optical fibers 10a and 10b may be controlled. Accordingly, a multi-wavelength interference spectrum and wavelength interleaving of the spectrum may be generated.

Hereinafter, as shown in FIG. 2, a propagation process of light through the optical fiber flexible multi-wavelength filter 1 according to the exemplary embodiment of the present invention will be described.

When light is incident on the polarization beam splitter 11 by the broadband light source 2, the light is divided into a vertically polarized light component and a horizontally polarized light component which are perpendicular to each other, and the two components circulate in the optical fiber flexible multi-wavelength filter 1 in their respective clockwise and counterclockwise directions.

The vertically polarized light component moving clockwise through the polarizer 11a may pass the ½ wave plate 12a, the high-birefringence optical fiber 10a, the ½ wave plate 12b, the high-birefringence optical fiber 10b, the ½ wave plate 12c, and the polarizer 11b in successive order. On the other hand, the horizontally polarized light component moving counterclockwise passes the ½ wave plate 12c, the high-birefringence optical fiber 10b, the ½ wave plate 12b, the high-birefringence optical fiber 10a, and the ½ wave plate 12a, in the reverse order with respect to the above-described order of the vertically polarized light component. Thus, the two polarized light components are recombined by the polarization beam splitter 11, and then input to the optical spectrum analyzer 3 to be analyzed.

Next, experimental results for controlling a wavelength of a spectrum using the optical fiber flexible multi-wavelength filter 1 according to the exemplary embodiment of the present invention will be described.

Figure 3:
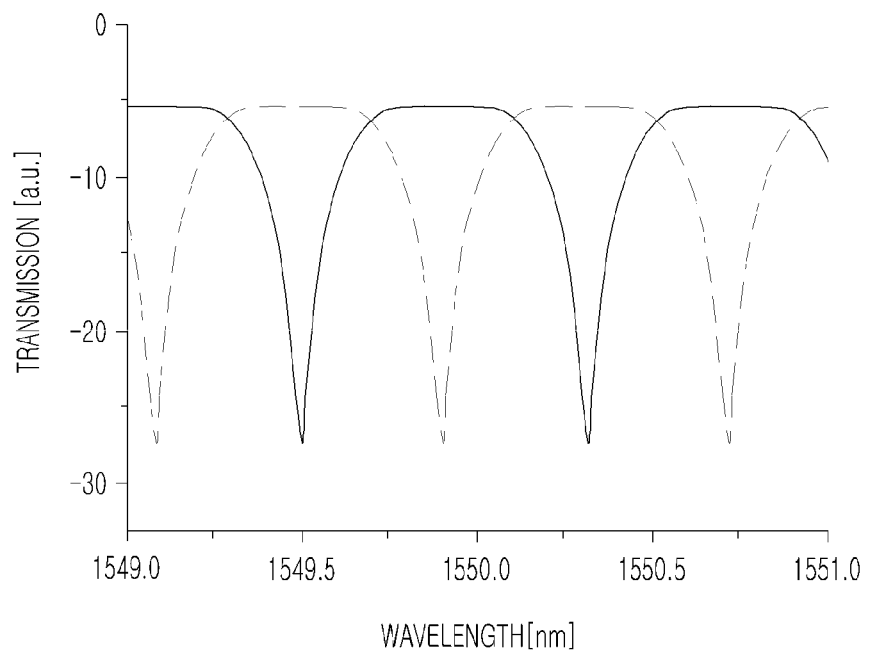
FIG. 3 is a graph showing a first flat band mode and a wavelength interleaved transmission spectrum measured through an optical fiber flexible multi-wavelength filter.
Figure 4:
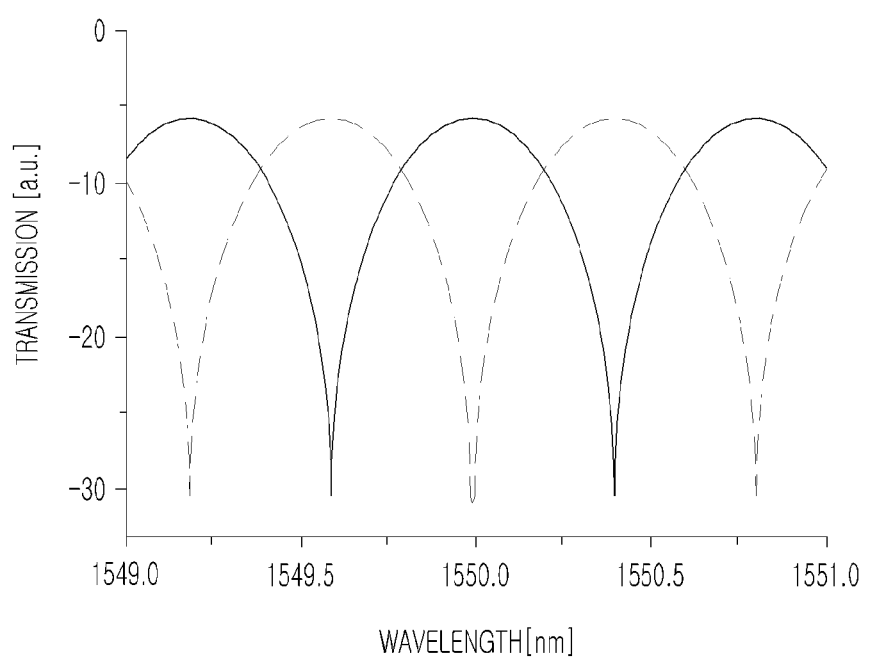
FIG. 4 a graph showing a first narrow band mode and a wavelength interleaved transmission spectrum measured through the optical fiber flexible multi-wavelength filter.
Figure 5:
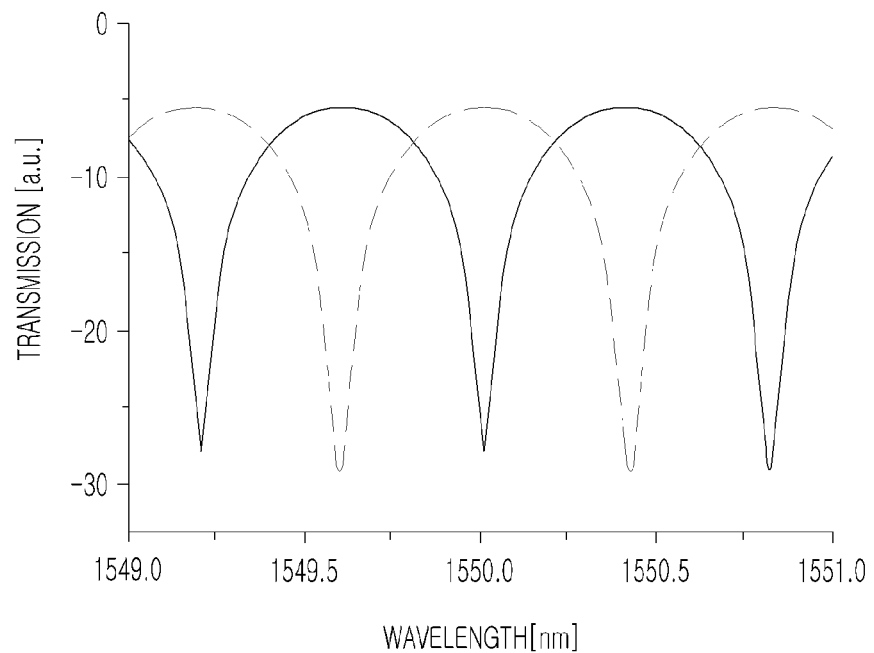
FIG. 5 is a graph showing a zeroth spectrum and a wavelength interleaved transmission spectrum measured through an optical fiber flexible multi-wavelength filter.
Figure 6:
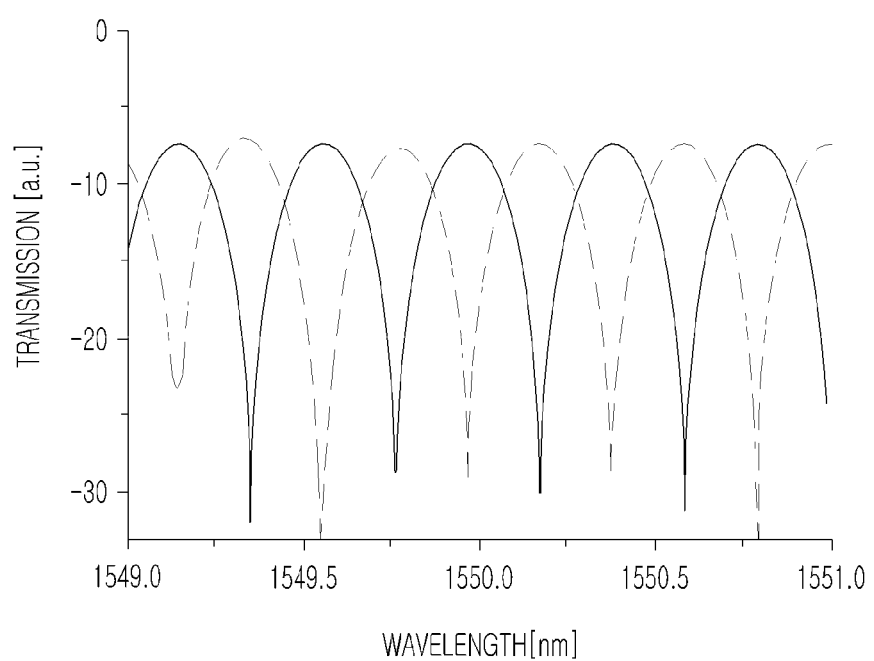
FIG. 6 a graph showing a half-cycle zeroth spectrum and a wavelength interleaved transmission spectrum measured through an optical fiber flexible multi-wavelength filter.

FIG. 3 is a graph showing a first flat band mode and a wavelength interleaved transmission spectrum measured through an optical fiber flexible multi-wavelength filter, and FIG. 4 is a graph showing a first narrow band mode and a wavelength interleaved transmission spectrum measured through the optical fiber flexible multi-wavelength filter. FIG. 5 is a graph showing a zeroth spectrum and a wavelength interleaved transmission spectrum measured through an optical fiber flexible multi-wavelength filter, and FIG. 6 is a graph showing a half-cycle zeroth spectrum and a wavelength interleaved transmission spectrum measured through the optical fiber flexible multi-wavelength filter. A detailed description will be given with reference to FIGS. 3 to 6.

In addition, based on the above-described FIGS. 1 and 2, a configuration of the optical fiber flexible multi-wavelength filter 1 according to the exemplary embodiment of the present invention will be described.

FIGS. 3 to 6 show experimental results of transmission spectra though the optical fiber flexible multi-wavelength filter 1 according to the exemplary embodiment of the present invention, which were measured by the optical spectrum analyzer 3.

Here, a resolution of the optical spectrum analyzer 3 used for the measurement was set to be 0.02 nm, and a transmission spectrum was observed in a wavelength band of 1549 nm to 1551 nm. In addition, lengths of the high-birefringence optical fibers 10a and 10b were set to be 6.55 m such that a channel space of the transmission spectrum became 0.8 nm at a center wavelength of 1550 nm.

FIG. 3 shows the results obtained by measuring a flat band mode and an interleaved flat band mode among the first interference spectra having a channel space of 0.8 nm, and the extinction ratio and the insertion loss in the flat band mode were measured to be about 23 dB and 5.35 dB, respectively.

FIG. 4 shows the results obtained by measuring a narrow band mode and an interleaved narrow band mode among the first interference spectra with a channel space of 0.8 nm, and the extinction ratio and the insertion loss in the flat band mode were measured to be about 26 dB and 5.36 dB, respectively.

FIG. 5 shows the results obtained by measuring a zeroth interference spectrum and an interleaved zeroth interference spectrum, that is, a basic mode and an interleaved basic mode, with a channel space of 0.8 nm, and the extinction ratio and the insertion loss in the flat band mode were measured to be about 24 dB and 5.45 dB, respectively.

FIG. 6 shows results obtained by measuring a zeroth interference spectrum and an interleaved zeroth interference spectrum, that is, a half-cycle basic mode and an interleaved half-cycle basic mode, with a channel space of 0.8 nm, and the extinction ratio and the insertion loss in the flat band mode were measured to be about 16 dB and 6.83 dB, respectively.

Here, the insertion loss may be generated due to an insertion loss of the polarization beam splitter 11 and ½ wave plates (i.e., 12a to 12c), and a fusion splicing loss between the high-birefringence optical fibers 10a and 10b.

In addition, when there is birefringence in the single-mode optical fibers 13 and 14 used for the connection of the optical elements configuring the optical fiber flexible multi-wavelength filter 1, according to the exemplary embodiment of the present invention, or an error in the cutting length in the pair of high-birefringence optical fibers 10a and 10b, the extinction ratio of the optical fiber flexible multi-wavelength filter 1 may be degraded.

As a result, as shown in FIGS. 1 to 6, when the optical fiber flexible multi-wavelength filter 1 configuring a Sagnac interferometer-type polarization-diversity loop is implemented, wavelength interleaving may be generated in a variety of output modes (e.g., a full-cycle zeroth interference spectrum, a half-cycle zeroth interference spectrum, a full-cycle first interference spectrum, etc.).

In addition, since the angle difference (i.e., azimuth) between the principal axes is freely controlled by one of the ½ wave plates (i.e., 12a to 12c) of the polarization controller 12 inserted between the high-birefringence optical fibers 10a and 10b, wavelength interleaving can be implemented in the full-cycle narrow band mode, the full-cycle basic mode, and the half-cycle basic mode, in addition to the full-cycle flat band mode among the first interference spectra.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An optical fiber flexible multi-wavelength filter based on a polarization-diversity loop, comprising:
   a pair of high-birefringence optical fibers;
   a polarization beam splitter connected to the pair of high-birefringence optical fibers and dividing light incident from a broadband light source into two polarized beams; and
   a polarization controller connected to the high-birefringence optical fibers or the polarization beam splitter and controlling the two polarized beams divided by the polarization beam splitter,
   wherein the polarization controller includes a ½ wave plate or a ¼ wave plate, and the polarization controller disposed between the high-birefringence optical fibers controls an angle difference between principal axes of the high-birefringence optical fibers and visibility, and interference in the high-birefringence optical fibers is controlled by changing polarized light incident from the broadband light source using the polarization controller, and a multi-wavelength interference spectrum and interleaving of a wavelength of the spectrum is generated.

2. The optical fiber flexible multi-wavelength filter of claim 1, wherein the high-birefringence optical fibers, the polarization beam splitter, and the polarization controller are interconnected through an optical fiber, and the optical fiber is connected using any one of a fusion splicing method, an optical fiber patch cord, and a mechanical splicer.

3. The optical fiber flexible multi-wavelength filter of claim 2, wherein the optical fiber includes one or more of a single-mode optical fiber, a multi-mode step-index optical fiber, a multi-mode graded-index optical fiber, and a high numerical aperture multi-mode optical fiber.

4. The optical fiber flexible multi-wavelength filter of claim 2, wherein the optical fiber includes one or more of a silica-based optical fiber, a fluorine-based optical fiber, a rare-earth-based optical fiber, a polymer-based optical fiber, and a flint glass optical fiber.

5. The optical fiber flexible multi-wavelength filter of claim 2, wherein the optical fiber includes one or more of a photonic crystal optical fiber, a multi-core optical fiber, a twisted optical fiber, an etched optical fiber, a tapered optical fiber, a lensed optical fiber, and a metal-coated optical fiber.

6. The optical fiber flexible multi-wavelength filter of claim 2, wherein the optical fiber includes one or more of a polarization-maintaining optical fiber, a nonlinear optical fiber, a dispersion-shifted optical fiber, a dispersion compensation optical fiber, and a non-zero dispersion-shifted optical fiber.

7. The optical fiber flexible multi-wavelength filter of claim 1, wherein the high-birefringence optical fibers include one or more of a bowtie-type high-birefringence optical fiber, a panda-type high-birefringence optical fiber, an elliptical core-type high-birefringence optical fiber, a polarization-maintaining photonic-crystal optical fiber, and a polarization-maintaining large-mode area optical fiber.

8. The optical fiber flexible multi-wavelength filter of claim 1, wherein the polarization controller is a bulk-type or an optical fiber-type.

9. A method of controlling a wavelength of a spectrum using, comprising:
   providing a polarization controller including ½ wave plate or ¼ wave plate, wherein the polarization controller disposed between high-birefringence optical fibers controls an angle difference between principal axes of the high-birefringence optical fibers and visibility; and
   controlling interference in the high-birefringence optical fibers by changing polarized light incident from a broadband light source using the polarization controller, to generate a multi-wavelength interference spectrum and interleaving of a wavelength of the spectrum, wherein the polarized light incident from a broadband light source provided using a polarization beam splitter.

* * * * *